United States Patent [19]

Ingalls

[11] 4,328,063

[45] May 4, 1982

[54] AUTOMATIC FRUIT LABELER

[76] Inventor: James E. Ingalls, 400 2nd Ave. NE., St. Petersburg, Fla. 33701

[21] Appl. No.: 239,412

[22] Filed: Mar. 2, 1981

[51] Int. Cl.$^3$ .......... B32B 31/00

[52] U.S. Cl. .......... 156/361; 156/542; 156/584

[58] Field of Search .......... 156/361-364, 156/350, 540-542, 344, 584; 250/548, 559, 571; 271/110, 111

[56] References Cited

U.S. PATENT DOCUMENTS

| | | | |
|---|---|---|---|
| 3,329,550 | 7/1967 | Kucheck | 156/584 X |
| 3,489,638 | 1/1970 | Collons | 156/584 |
| 3,944,455 | 3/1976 | French | 156/361 |
| 4,048,494 | 12/1978 | Liesting | 250/223 |
| 4,123,310 | 10/1978 | Varon et al. | 156/361 X |
| 4,194,941 | 3/1980 | Briggs et al. | 156/361 |

*Primary Examiner*—David A. Simmons
*Attorney, Agent, or Firm*—Walter J. Monacelli

[57] ABSTRACT

The device disclosed herein comprises a machine adapted to apply labels to round or oval fruit such as oranges, grapefruit, tomatoes, lemons, apples, etc. This machine has chutes down which the fruit rolls to where a label is positioned with the adhesive side of the label facing upward so as to come in contact with the fruit as it rolls over that area. An electric eye is aimed at the area where the label is positioned to come in contact with the fruit so that when the label is removed by the fruit, the electric eye activates a device which moves the belt on which a series of labels are positioned so that the next label is moved to this fruit-contacting area. This belt is adapted to make a sharp upward reverse turn so as to detach itself from the label as the label reaches the fruit-contacting area. Underneath this fruit-contacting area there is a conduit which has openings or ports at this area through which a vacuum is applied to hold the label in position until the fruit has rolled over and picked up the label.

4 Claims, 8 Drawing Figures

FIG. 3
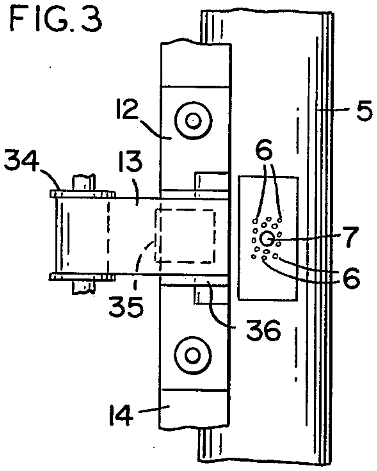
FIG. 4
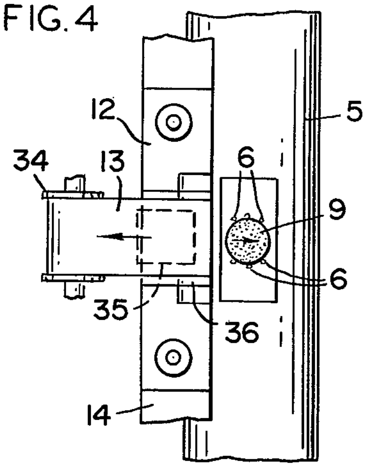
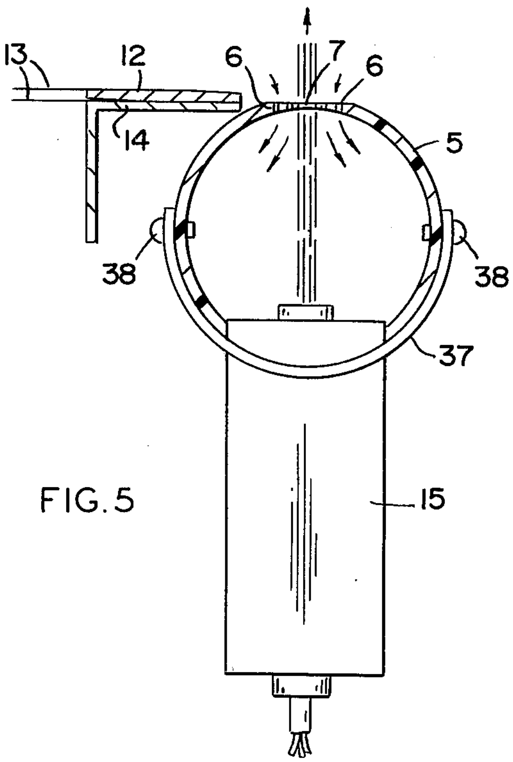
FIG. 5
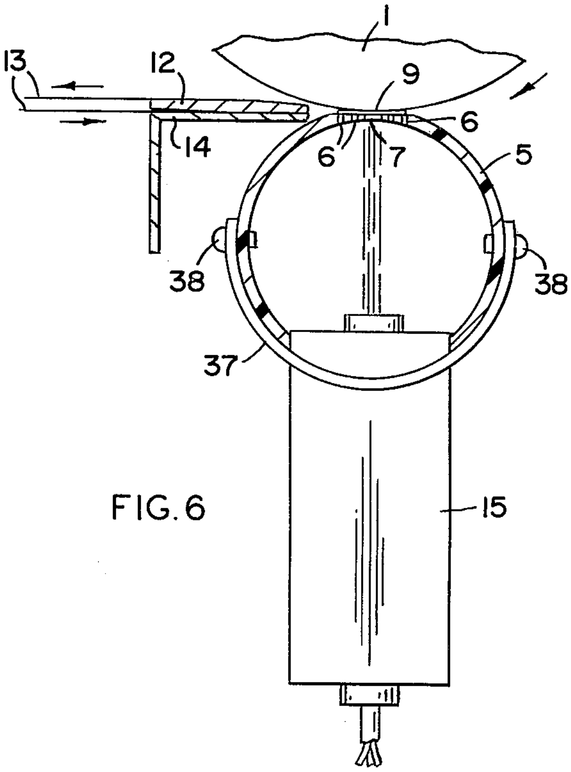
FIG. 6
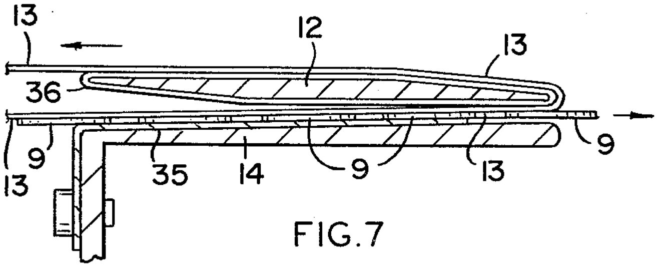
FIG. 7
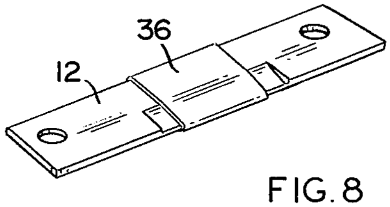
FIG. 8

AUTOMATIC FRUIT LABELER

BACKGROUND OF THE INVENTION

1. Field of the Invention

This invention relates to a machine adapted to apply labels to fruit. More specifically, it relates to a machine which positions labels in an area where the adhesive side of the label will come in contact with the fruit as it rolls over the label and is picked up thereby. Still more specifically, the labels are held in position by a vacuum applied underneath and an electric eye actuates movement of the conveying belt on which the labels are transported to the fruit-contacting area.

2. State of the Prior Art

A number of machines have been designed to apply adhesive labels to fruit. U.S. Pat. No. 4,194,941 shows a device which extends labels almost vertically upward and as the fruit contacts the label it presses the label against a roller which rotates with and engages the label against the fruit so that it becomes adhered thereto.

U.S. Pat. No. 3,944,455 shows such a machine in which a vacuum is applied to hold the label in position. U.S. Pat. No. 4,048,494 teaches the use of an electric eye to determine when a label has been removed from the application area.

However, since the vacuum directing area and the electric eye sensing area are the same area, there is no showing in the prior art as to the combination of the use of a vacuum applicator and an electric eye sensing device.

SUMMARY OF THE INVENTION

In accordance with the present invention a machine has been designed in which adhesive labels are positioned horizontally in the appropriate area for contacting the fruit, held in position by application of vacuum, and removal of the label from this position causes an electric eye to actuate placement of another label. In other words, it has been found possible by the design of this new machine to have these three functions performed in this same application area and have the electric eye function through the vacuum applying component.

This machine may be illustrated by reference to the accompanying drawings in which:

FIG. 3 is a plan view of the label feed station before the label reaches the vacuum ports and electric eye port;

FIG. 4 is a similar view as in FIG. 3 except that a label is in position to cover the vacuum ports and the electric eye port;

FIG. 5 is an end elevational view of the label feed station of FIG. 3 taken in cross-section of the vacuum-applying conduit at the vacuum ports and electric eye port area;

FIG. 6 is a similar view as in FIG. 5 with the label and the fruit in position above the vacuum ports;

FIG. 7 is a side elevational view taken in cross-section of the label feed system; and FIG. 8 is a perspective view of a spring bar with an anti-friction tape over the area on which the conveying belt travels.

Figure 1:
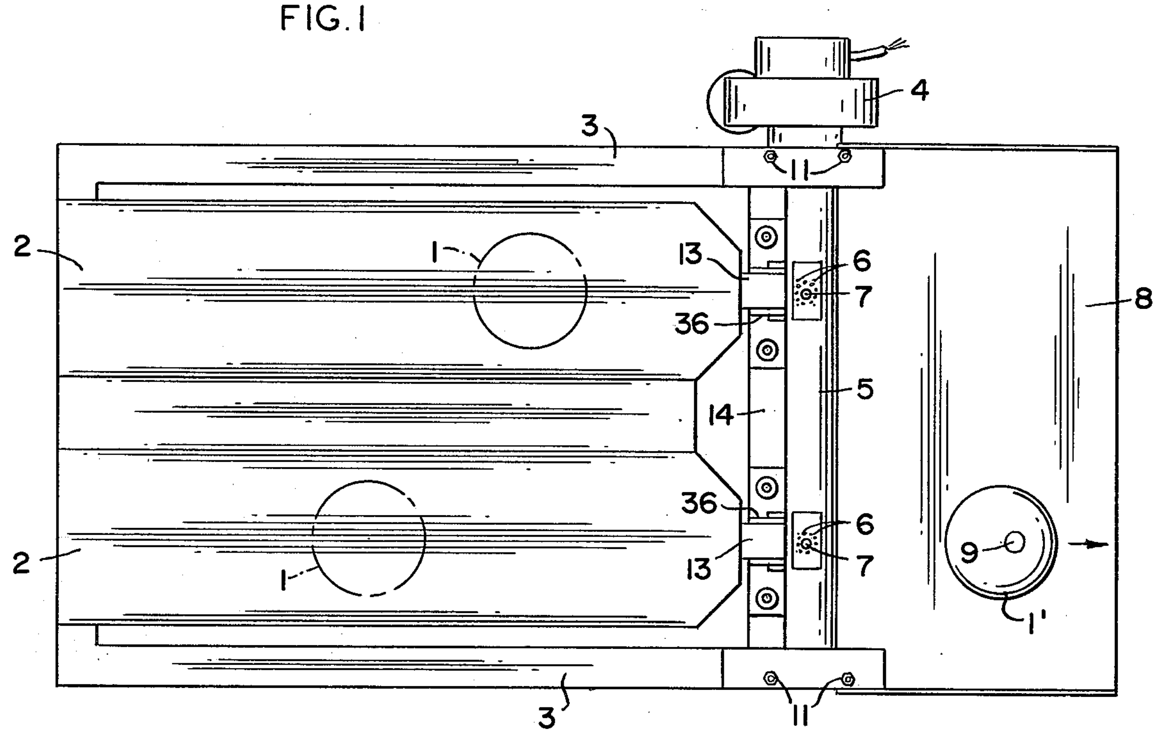
FIG. 1 is a top plan view of a preferred modification of this invention.
Figure 2:
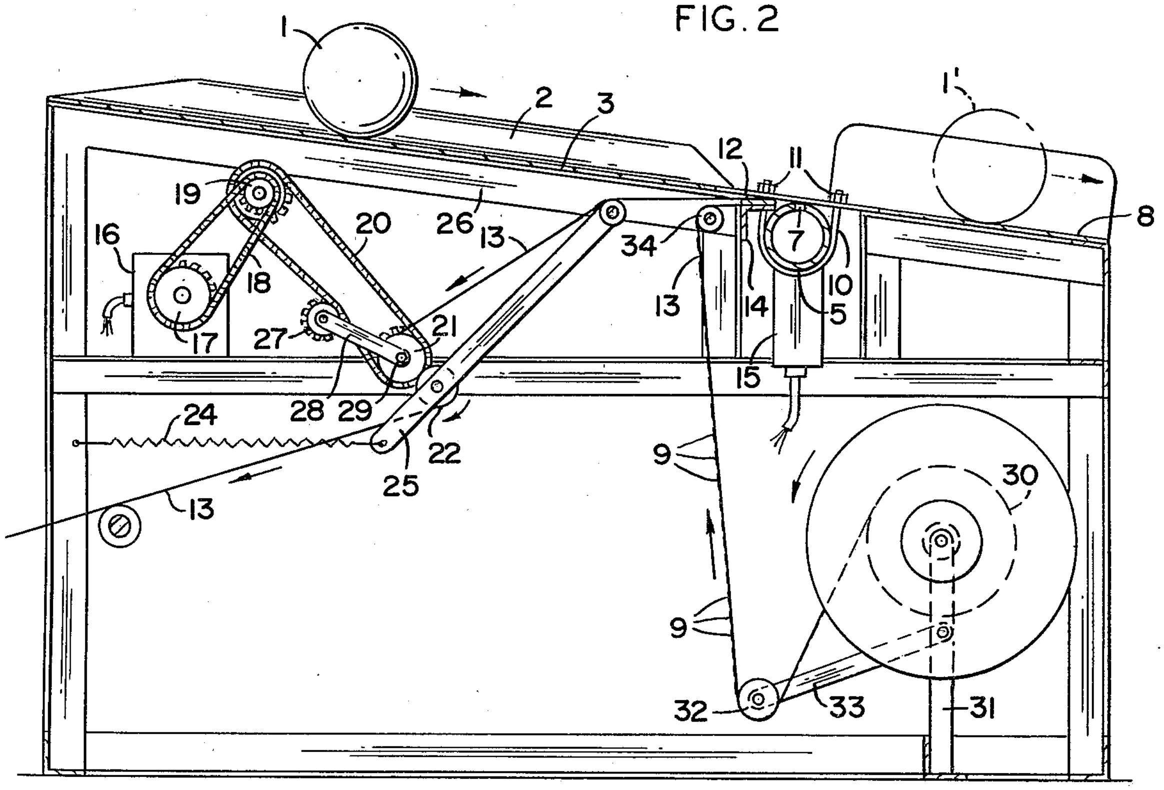
FIG. 2 is a side elevational view partly broken away and in section.

In the various figures, the fruit 1 rolls down slanted chutes 2 which are positioned in feed ramp 3. In this modification there are two chutes but there may be as many as six or more with corresponding numbers of label feeding, and vacuum and electric eye ports. Blower 4 pumps air out of conduit 5 and thereby applies vacuum thereto and causes air suction through vacuum ports 6 and electric eye port 7 which is open and is small enough to serve also as a vacuum port. After passing the label applying area, the fruit 1 passes down exit ramp 8 with label 9 attached. Vacuum conduit 5 is supported by support brackets 10 and nuts 11. In the label feeding assembly, label applying bar 12 provides a sharp reverse path for the conveying belt 13 to travel after it travels between bar 12 and spring steel bar 14. In making this sharp reversal in the direction of conveying belt 13, an individual label projects itself substantially horizontally toward the vacuum ports 6 in conduit 5, peeling itself off of conveying belt 13 and becoming positioned and held by the vacuum over the vacuum ports 6 and electric eye port 7. Electric eye component 15 is situated below and extending into conduit 5 with the light beam projected from component 15 being directed upward to electric eye port 7. A tight seal is provided between the electric eye component 15 and the edge of the opening in conduit 5 which permits entry of the light emitting end of photocell component 15 into conduit 5. This tight seal insures against undesired dissipation of the vacuum provided inside conduit 5. Blower 4 sucks air out of conduit 5 to provide the desired vacuum.

When a label is removed from its horizontal position over electric eye port or photocell 7, the light beam transmitted to this port 7 is affected by the absence of a label. Motor 16 drives wheel 17 to pull belt 18 and drive wheel 19 which in turn pulls belt 20 to drive wheel 21. Wheels 19 and 21 have clutch components which, when actuated by the electric eye, engage the movement of belt 20 and thereby cause rotation of wheel or gear 21. Belt or label backing 13 passes around wheel or gear 21 and between wheel or gear 21 and wheel or gear 22, and over guide 23. Spring 24 is attached to bar 25 on which wheel or gear 22 is rotatably affixed. The opposite end of bar 25 is pivotally attached to frame 26. The tension created by spring 24 on bar 25 causes pressure of wheel or gear 22 on wheel or gear 21 and effects movement of belt 13 in the direction indicated. Pressure is applied on belt 20 to keep it taut by wheel or gear 27 which is rotatably attached to bar 28 whose opposite end is affixed to the axle 29 of wheel or gear 21 in such a manner as to apply the desired pressure of wheel or gear 27 against belt 20.

As belt or label backing 13 is periodically advanced over wheel or gear 21, this pulls belt 13 over the label applying bar 12. In turn, more of the belt 13 is unwound from feed roll 30 which is supported on stand 31. As belt 13 with a series of labels 9 thereon is unwound from feed roll 30, it passes over guide 32 which is supported by rod 33 extending from supporting stand 31. Then belt 13 passes over guide 34 on its way to passage between label applying bar 12 and bar 14.

In FIG. 5, bracket 37 supports the electric eye component 15 and provides a tight seal against conduit 5 to which it is fastened by bolts 38.

In FIGS. 7 and 8, label applying bar 12 is provided with nylon or other friction-reducing tape 36 and is provided with a spring steel finger 35 to maintain pressure on the underside of belt or backing 13.

The machine of this invention has very efficient utility in applying labels to fruit as described. In a machine of this type equipped with six feeding chutes, it is possible to label as many as 3200 pieces of fruit per minute. Moreover, it is not necessary to grade the fruit according to size prior to labeling since this equipment performs on fruit of varying sizes.

The vacuum or reduced pressure applied at openings or ports 6 is such that it will not hold the label tight enough to prevent its sliding over the entire number of said openings as it is peeled off the conveying tape or belt 13 but will hold the label flat against the conduit which advantageously presents a flat surface in that area. For creating this vacuum, a small turbine type of blower is found effective to create a satisfactory vacuum in conduit 5 with the direction of blowing being away from the said openings. The conduit is otherwise sealed except for these openings. The area over which the vacuum openings are distributed is advantageously about the same area covered by the label. This keeps the label flat until picked up by the fruit. For most purposes, circular labels are preferred, but they can also be oval, square, rectangular or even other shapes. It has been found advantageous to have the electric eye beam port about 3/16 in diameter and the individual vacuum ports about 1/16 inch in diameter.

The electric eye component 15 may be of any type which will detect the absence of a label in the desired area and thereby actuate movement of belt 13 to place another label over the vacuum openings 6. A preferred electric eye component is one which transmits an infrared beam and also a sensor beam to the said electric eye opening so as to converge in the area over where the label is to be positioned. If the label is present it interferes with convergence of the two beams so that there is no reaction. However, if the label is absent, convergence of the infrared beam and the sensor beam occurs and causes a reaction which actuates the mechanism to move belt 13 so as to position another label over the vacuum ports and the electric eye port.

While certain features of this invention have been described in detail with respect to various embodiments thereof, it will of course be apparent that other modifications can be made within the spirit and scope of this invention and it is not intended to limit the invention to the exact details shown except insofar as they are defined in the following claims.

The invention claimed is:

1. In a machine for applying labels to individual pieces of round or oval fruit from a movable belt carrying a supply of said labels spaced individually from each other, the improvement comprising the combination of:

a. a bar so shaped and positioned as to provide a sharp reversal in path as said movable belt passes against the underside and then the upper side of said bar so as to provide a sharp reversal of path of said belt thereby effecting extension and peeling of said individual labels with an adhesive side facing upward;

b. a conduit positioned adjacent to said bar where said sharp reversal in path of said movable belt is effected, said conduit being positioned so that as said individual labels are extended from said belt they will be extended and moved to a position over a certain upper area of said conduit, said conduit having in said area over which said labels are individually positioned a plurality of openings comprising one opening large enough for a beam of light to pass through and said opening being surrounded by a number of smaller openings, and said conduit having a still larger opening in the lower region of said conduit and positioned vertically under said large opening in the upper region of said conduit, said conduit being sufficiently otherwise sealed so as to create a sucking of air into said upper area openings when a reduced pressure is created in said conduit;

c. an electric eye component extending upward through said opening in the lower portion of said conduit, being tightly sealed against the edge of said opening, and adapted to sense the absence of a label positioned above said upper area openings of said conduit and thereby to actuate movement of said movable belt to position a label over said upper area openings; and d. A means for creating a reduced pressure in said conduit.

2. The machine of claim 1, in which the area of said conduit in which said upper area openings are presented is a flat area.

3. The machine of claim 2, in which said reduced pressure creating means is a blower directed to exhaust air from said conduit.

4. The machine of claim 3, in which said large opening in the upper area of said conduit is about 3/16 inch in diameter and said smaller openings in said upper area are about 1/16 inch in diameter.

* * * * *